Patented Feb. 9, 1937

2,069,974

UNITED STATES PATENT OFFICE 2,069,974

CELLULOSE ESTERS AND PROCESS OF PREPARING THEM

Ferdinand Schulze, Buffalo, N. Y., assignor, by mesne assignments, to E. I. du Pont de Nemours & Company, Wilmington, Del., a corporation of Delaware No Drawing. Application January 22, 1930, Serial No. 422,548

13 Claims. (Cl. 260—101)

This invention relates to the art of cellulose esters, and more particularly to esters of cellulose containing dicarboxylic acid groups and to processes of making such esters.

It has previously been proposed to prepare cellulose esters containing dicarboxylic acid groups by reacting cellulose and phthalic acid or its anhydride in the presence of zinc chloride, or by substituting an alkyl radical for the hydrogen of one carboxyl group of phthalic acid and then reacting this product with cellulose in the presence of certain compounds which influence the reaction. Compounds prepared by the methods just indicated, however, contain, for example, only 1 phthalic group in 8 $C_6H_{10}O_5$ groups and are insoluble in most solvents owing to the relatively high proportion of cellulose.

I have discovered that cellulose esters can be prepared by treating cellulose material containing a free hydroxyl group with anhydrides of dicarboxylic acids in the presence of tertiary amines and that the resulting esters, in which one carboxyl group of the acid is free and the other carboxyl group is esterified with a hydroxyl group of the cellulose, contain a large amount of the acid radical and usually at least one molecule of the dicarboxylic acid group for each molecule of the cellulose group. Furthermore, such esters have the usual characteristics of an acid in that they are soluble in the common alkalies and are reprecipitated by the addition of acids, thus rendering them highly useful for many purposes, such as the preparation of artificial threads, plastics, and lacquers.

It is therefore an object of my invention to provide new and useful cellulose esters.

It is a further object of my invention to provide a new method of making cellulose esters.

It is a more specific object of my invention to provide new and useful dicarboxylic acid esters of cellulose and to provide a new method of making such esters.

With the above and other objects in view, which will be apparent as the description proceeds, I have set forth my invention in the following specification and have included the following examples by way of illustration and not as a limitation.

Example 1

16 parts by weight of cotton linter pulp, which has been cut to small squares, 75 parts by weight of phthalic anhydride and 75 parts by weight of anhydrous pyridine are heated at 100° C. until the pulp has completely disintegrated and the mixture has become a pasty mass, which is usually in from 24 to 48 hours. Stirring is desirable as it shortens the reaction time. The reaction product is then dissolved in from 200 to 500 parts by weight of water, in which it forms a viscous solution, and from which the cellulose hydrogen phthalate is precipitated out by pouring the solution in a thin stream into dilute mineral acid, such as hydrochloric. The cellulose hydrogen phthalate is filtered off and washed with water. The filtrate contains most of the pyridine, which may be recovered from the solution. The solid material contains some free phthalic acid, which was precipitated along with the cellulose hydrogen phthalate, and this is removed by drying the solid material at room temperature, grinding it, and extracting with hot water or organic solvents, such as ether or chloroform. By analysis the purified material was found to contain 51.3% phthalic acid radical and therefore has 1.14 phthalic groups for 1 $C_6H_{10}O_5$ group, indicating that it is practically pure cellulose mono-hydrogen phthalate.

This product is soluble in pyridine, in a solution of pyridine in water, in a 5–10% ammonium hydroxide solution, or in a 5% sodium hydroxide solution. I prefer to use ammonium hydroxide rather than sodium hydroxide as the latter saponifies the ester in a relatively short time and the solution sets to a gel, whereas ammonium hydroxide solutions of the ester remain fluid for over a week.

Example 2

19 parts by weight of mono ethyl cellulose, 75 parts by weight of phthalic anhydride and 75 parts by weight of pyridine are heated at 100° C. until the ethyl cellulose has dissolved, which requires from 12 to 24 hours. Stirring or kneading of the mass shortens the time required for reaction. The product is isolated and purified according to the procedure of Example 1. The resulting ethyl cellulose hydrogen phthalate is soluble in basic solutions and precipitates when the solution is acidified.

Example 3

18 parts by weight of mono methyl cellulose, 75 parts by weight of phthalic anhydride and 75 parts by weight of pyridine are heated at 100° C. until the reaction is complete as indicated by the complete disappearance of the fibers of methyl cellulose. Subsequent treatment is identical with that used in Examples 1 and 2. The resulting methyl cellulose hydrogen phthalate is soluble in basic solutions and is precipitated by acids.

Example 4

10 parts by weight of cellulose diacetate, 15 parts by weight of phthalic anhydride and 30 parts by weight of pyridine are heated at 85–90° C. for 24 hours. The resultant viscous solution is poured in a thin stream into dilute acid and is then thoroughly washed with warm water and dried. The resulting cellulose diacetate hydrogen phthalate is soluble in ammonium hydroxide and in acetone.

Example 5

20 parts by weight of cellulose mono benzoate, 75 parts by weight of phthalic anhydride and 75 parts by weight of pyridine are heated at 100° C. until a homogeneous solution is formed. The product is isolated and purified as in Example 1. The resulting cellulose benzoate hydrogen phthalate is soluble in basic solutions and is precipitated by acids.

Example 6

4 parts by weight of cellulose, 15 parts by weight of succinic anhydride, 25 parts by weight of pyridine and 25 parts by weight of xylene are heated at 100° C. for 40 hours. The cellulose swells but does not dissolve. It is freed of excess liquid and is then extracted with alcohol and dried. The resulting cellulose hydrogen succinate is soluble in a 10% sodium hydroxide solution and is precipitated from this solution by acids.

Example 7

1 part by weight of mono ethyl cellulose, 20 parts by weight of quinolinic anhydride, and 20 parts by weight of pyridine are heated at 100° C. for 10 hours, at which time all the ethyl cellulose has practically dissolved. The product is purified as in Example 1. The resulting ethyl cellulose hydrogen quinolinate is soluble in ammonium hydroxide solution and is precipitated by dilute acids.

Although the above examples are limited to the use of cellulose, mono-ethyl cellulose, mono-methyl cellulose, cellulose diacetate, and cellulose mono-benzoate as the cellulosic ingredient, other forms of cellulose containing a free hydroxyl group can be used. For example, I may use cotton, wood pulp, rayon waste, the lower acetates, nitrates, and benzoates of cellulose, or the lower ethers of cellulose. According to the cellulose source the resulting product is a cellulose derivative or a mixed ester.

Similarly, although the examples are limited to the use of phthalic anhydride, succinic anhydride, and quinolinic anhydride, other anhydrides can be used.

Furthermore, while pyridine has been set forth as the preferred tertiary amine, I do not wish to be limited thereto, but desire to cover all other tertiary amines which are the equivalent of pyridine for this purpose, such as picoline and other homologues of pyridine.

Although the temperatures given in the above examples fall within the range of 85° to 100° C., I do not wish to be limited to these temperatures, since somewhat higher or lower temperatures, e. g., 70° C., can be used.

The cellulose esters described herein may be analyzed by two methods:

In the first method the sample is dissolved in a 20% solution of pyridine in water. Phenol phthalein is added as indicator and the solution is titrated with standard N/5 sodium hydroxide. In this case one mole of NaOH is equivalent to one acid group.

In the second method, the sample is treated with an excess of standard N/5 sodium hydroxide and the mixture is gently boiled for several hours until the ester is completely saponified. Phenol phthalein and a slight excess of standard acid are added and the solution is back titrated with standard sodium hydroxide. In this method two moles of NaOH are equivalent to one acid group.

In an application Serial No. 422,549, filed Jan. 22, 1930 in which I am a joint inventor with Joseph F. Haskins, there is disclosed a process of making cellulose esters by treating cellulose with acid anhydrides in the presence of a tertiary amine, such as pyridine, wherein a catalyst is used to speed up the reaction without affecting the quality of the product secured. The use of such catalysts is equally applicable to the production of esters of dicarboxylic acids, but no claims are made to this modification in the present case since it is claimed in the case mentioned.

The compounds prepared in accordance with my invention may be used in the preparation of threads and films by the simple process of dissolving in dilute alkalies and spinning into dilute acids. They may likewise be used for many other purposes, such as plastics and lacquers. After being formed into the desired shapes, they may be further treated in well known ways to render them insoluble in the liquids to which such objects are continuously exposed.

It will therefore be apparent that I have invented new and useful dicarboxylic acid esters of cellulose and new and useful methods of producing such esters, and that these new materials may be used for a variety of useful purposes.

As many apparently widely different embodiments of this invention may be made without departing from the spirit and scope thereof, it is to be understood that I do not limit myself to the specific embodiments thereof except as defined in the appended patent claims.

I claim:

1. The process of making alkali-soluble dicarboxylic acid esters of cellulose, which comprises heating cellulose containing the cellulose radical $C_6H_7O_2$ and an OH group with the anhydride of a dicarboxylic acid in the presence of a tertiary amine until the product is alkali-soluble.

2. An alkali-soluble dicarboxylic acid ester of cellulose.

3. An alkali-soluble dicarboxylic acid ester of cellulose, in which there is a free carboxyl group of the dicarboxylic acid.

4. The product of claim 5, in which there is a free carboxyl group of the dicarboxylic acid.

5. A dicarboxylic acid ester of cellulose containing at least one molecule of the dicarboxylic acid group for each molecule of cellulose calculated as $C_6H_{10}O_5$.

6. The process of making alkali-soluble dicarboxylic acid esters of cellulose, which comprises heating cellulose containing the cellulose radical $C_6H_7O_2$ and a hydroxyl group with phthalic anhydride in the presence of a tertiary amine at a temperature of from 70–100° C. until the mass is disintegrated.

7. The process of making an alkali-soluble dicarboxylic acid ester of cellulose which comprises heating cellulose containing the cellulose radical $C_6H_7O_2$ and an OH group at a temperature of from 70–100° C. with the anhydride of a dicarboxylic acid in the presence of a tertiary amine until the mass is disintegrated.

8. A process for making dicarboxylic acid esters of cellulose which comprises esterifying the cellulose with a dicarboxylic acid anhydride in the presence of pyridine.

9. A process of making cellulose phthalate which comprises esterifying cellulose with phthalic acid anhydride in the presence of pyridine.

10. A process for making dicarboxylic acid esters of cellulose which comprises esterifying the cellulose with a dicarboxylic acid anhydride in the presence of a tertiary amine.

11. A process of making cellulose phthalate which comprises esterifying cellulose with phthalic acid anhydride in the presence of a tertiary amine.

12. Alkali-soluble cellulose dicarboxylate.

13. Alkali-soluble cellulose phthalate.

FERDINAND SCHULZE.